(12) United States Patent
Scott et al.

(10) Patent No.: US 7,717,255 B2
(45) Date of Patent: May 18, 2010

(54) END OF ARM TOOL, APPARATUS, AND METHOD OF ENGAGING AN ARTICLE

(75) Inventors: Troy Scott, Spokane, WA (US); Chad E. Deines, Spokane, WA (US); Steven Gadau, Spokane, WA (US); Allen Jerome Chase, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 206 days.

(21) Appl. No.: 11/925,526

(22) Filed: Oct. 26, 2007

(65) Prior Publication Data

US 2008/0131253 A1 Jun. 5, 2008

Related U.S. Application Data

(60) Provisional application No. 60/863,333, filed on Oct. 27, 2006.

(51) Int. Cl.
*B65G 29/00* (2006.01)
(52) U.S. Cl. .............................. 198/867.11; 198/468.2; 414/744.1; 294/106
(58) Field of Classification Search ............ 198/867.01, 198/867.05, 867.06, 867.08, 867.02, 867.11, 198/375, 376, 377.03, 377.07, 468.01, 468.2, 198/468, 6, 345.2, 803.3, 803.11, 803.14, 198/750.11, 817, 465.1, 346.3, 470.1, 809, 198/346.1, 346.2; 414/680–744.8, 791.1, 414/792.9, 729, 751.1, 753.1
See application file for complete search history.

(56) References Cited

U.S. PATENT DOCUMENTS 2,807,493 A * 9/1957 Ryan et al. .................... 294/90
3,021,971 A * 2/1962 Rensch ........................ 414/732
3,048,288 A * 8/1962 Dwyer ........................ 414/734
3,202,260 A * 8/1965 Wolf ........................... 198/560
3,667,622 A * 6/1972 Kamphues et al. ........ 414/791.4
3,780,492 A * 12/1973 Corderoy ..................... 53/247
3,905,494 A * 9/1975 Yatagai et al. .............. 414/564
4,048,784 A * 9/1977 Toby ............................. 53/77
4,091,943 A * 5/1978 Bay-Schmith .............. 414/812
4,392,775 A * 7/1983 Ennis et al. ................. 414/729
4,494,973 A * 1/1985 Perry ........................... 65/260
4,525,121 A * 6/1985 Cawley ....................... 414/564
4,573,862 A * 3/1986 Anderson .............. 198/750.11
4,592,692 A * 6/1986 Suizu et al. ............... 414/792.8
4,697,689 A * 10/1987 Carrell ........................ 198/394
5,024,575 A * 6/1991 Anderson ................... 414/627
5,199,845 A * 4/1993 Hirashima et al. ........ 414/744.1
5,326,218 A * 7/1994 Fallas ......................... 414/733

(Continued)

*Primary Examiner*—Gene Crawford
*Assistant Examiner*—William R Harp
(74) *Attorney, Agent, or Firm*—Lee & Hayes, PLLC (57) ABSTRACT

A conveying system includes a robotic arm, an end-of-arm-tool, carried by the robotic arm, and a conveyor. In one example, the end of arm tool includes a plurality of engagement mechanisms arranged in an array. Each engagement mechanism includes at least two opposed fingers moveable between engaged and released positions, and is thereby adapted to grasp a soft-sided article from the conveyor. The conveyor includes a plurality of parallel tracks, each track separated from an adjacent track by a groove. A plurality of stops is configured to stop a plurality of soft-sided articles in an array analogous to the arrayed engagement mechanisms of the end-of-arm tool. In operation, the opposed fingers of each engagement mechanism pass through the grooves defined within the conveyor, to grasp upstream and downstream sides of an article, respectively, and underneath the article, which is then lifted by the robotic arm.

9 Claims, 9 Drawing Sheets

U.S. PATENT DOCUMENTS

| | | | |
|---|---|---|---|
| 5,403,056 A * | 4/1995 | Wallace | 294/98.1 |
| 5,539,981 A * | 7/1996 | Burcham et al. | 29/888.061 |
| 5,588,794 A * | 12/1996 | Panyard | 414/729 |
| 6,371,717 B1 * | 4/2002 | Grams et al. | 414/416.09 |
| 6,763,930 B2 * | 7/2004 | Johnson et al. | 198/459.6 |
| 7,395,916 B2 * | 7/2008 | Gorich et al. | 198/476.1 |
| 7,461,759 B2 * | 12/2008 | Guerra | 221/93 |
| 2006/0182607 A1 * | 8/2006 | Clark et al. | 414/744.5 |
| 2007/0169230 A1 * | 7/2007 | Salamanca | 901/2 |
| 2009/0116940 A1 * | 5/2009 | Burke et al. | 414/225.01 |

* cited by examiner

END OF ARM TOOL, APPARATUS, AND METHOD OF ENGAGING AN ARTICLE

CROSS REFERENCE TO RELATED APPLICATIONS

This application claims the priority to, and the benefit of, U.S. Provisional Application No. 60/863,333 filed Oct. 27, 2006, titled "End of Arm Tooling Apparatus and Method of Engaging an Article."

BACKGROUND

The conveying, alignment, and transport of articles, especially oddly shaped and difficult to engage packages, is problematic. For example, the process of engaging and transporting bagged items, such as bags of olives or candies, into shipping or transportation containers such as boxes or cartons poses unique problems.

BRIEF DESCRIPTION OF THE DRAWINGS

The detailed description is described with reference to the accompanying figures. The use of the same reference numbers in different instances in the description and the figures may indicate similar or identical items.

FIG. 2 shows various views of an example of an end of arm attachment in an open position.

FIG. 3 shows various views of the end of arm attachment shown in FIG. 2 in a closed position.

DETAILED DESCRIPTION

An apparatus is disclosed that, according to one implementation, includes a robotic arm, an end of arm tool attachment for engaging an article, and a position and location determination device. The article may be initially provided on a conveyor for conveying the article toward the end of arm tool. The conveyor may have two or more tracks that form one or more grooves for allowing fingers on the end of arm tool to pass between and below adjacent tracks so that the fingers can engage the bottom and/or sides of the article. The article may be any rigid or non-rigid body or product, such as a box, bag, sack, jar, or other shaped body.

A robotic arm is configured to manipulate the end of arm tool. The robotic arm may pivot, turn, rotate, or maneuver in any manner to adjust and position the end of arm tool to any desired position and/or location. The robotic arm may be activated and controlled using electrical, pneumatic, hydraulic, or other power. The robotic arm may have one or more power conduits for connection to the end of arm tool to provide power and control to the end of arm tool.

The end of arm tool may have a base, an engagement mechanism, and a power and/or control mechanism. The base may be provided to engage and/or interface with the robotic arm. The engagement mechanism may be any mechanism for grabbing, pulling, scooping or otherwise engaging an article, such as a product moving on a conveyor belt. The engagement mechanism may include or be connected to a power and/or control mechanism. The power and/or control mechanism may have electrical, pneumatic, hydraulic, electronic or other suitable components to provide power and control to the engagement mechanism.

One exemplary engaging mechanism may include fingers for engaging the article or product. The fingers may be curved, tilted, or projected inwardly relative to the article to engage the bottom and/or sides of the article. Engaging may include grabbing, grasping, gripping, handling, or otherwise interacting with the article. The fingers may be constructed or composed of metal, polymer, wood, ceramic, composite, or other suitable material.

The conveyor may be a conveyor belt, wheel, or other suitable conveying mechanism and may include two or more conveyor tracks. The conveyor tracks may be separated by one or more grooves that may be sized to permit one or more portions of the engaging mechanism on the end of arm tool to engage the article or product on the conveyor from a position that is at or below the horizontal surface of the conveyor belt. The conveyor tracks may be constructed or composed of metal, polymer, wood, ceramic, composite, fabric, or other suitable material. The conveyor tracks may be powered collaboratively or independently by a power source, which may have electrical, pneumatic, hydraulic, electronic or other suitable components to provide power and control to the conveyor tracks. The conveyor tracks and/or the power source may be supported by one or more substrates. Each substrate may be constructed or composed of metal, polymer, wood, ceramic, composite, or other suitable material.

The apparatus may have a sensing mechanism, such as a position, location, and/or orientation detection device. For example, sensing mechanism may include an IR sensor, a visual or photo tracking device, one or more physical stops or barriers, or other position determining device to collect information regarding the location of the article or any portion thereof on the conveyor relative to the robotic arm and/or the end of arm tool. Line tracking software or other interface may be provided to the apparatus to accept, calculate, record, and/or translate the position information. Such information may be utilized to adjust the position, orientation and/or location of the end of arm tool for engagement with the article.

Exemplary Implementation

The apparatus and method of utilizing the end of arm tool to transport an article may be more clearly understood through example implementations, such as are shown in FIGS. 1-8. The example implementations are for illustrative purposes only and are not intended to be limiting. For the sake of convenience, the implementations will be described for the transportation of one or more articles, such as bags of widgets.

Figure 1:
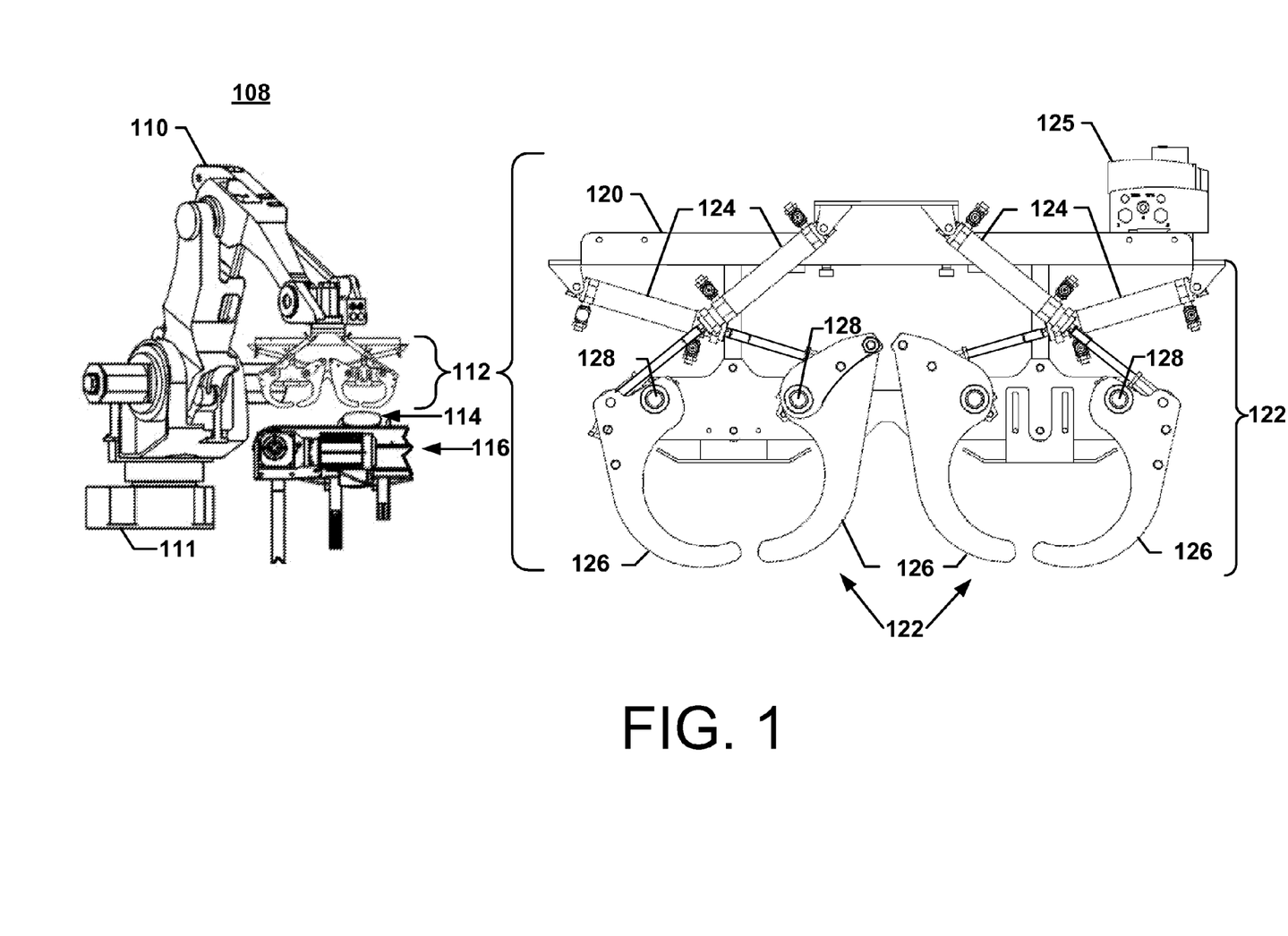
FIG. 1 shows a front elevational view of an example of an apparatus with an end of arm attachment having a plurality of fingers to engage a non-rigid article.
Figure 2A:
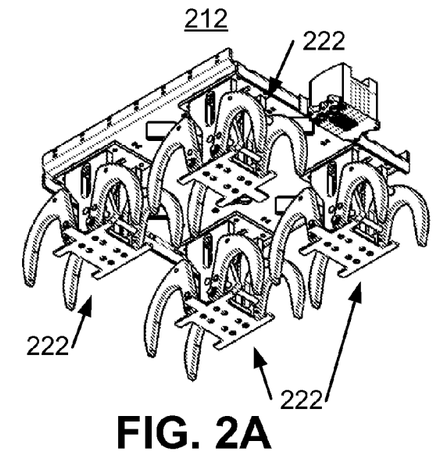
FIG. 2A shows a bottom perspective view of the alternative end of arm attachment.
Figure 2B:
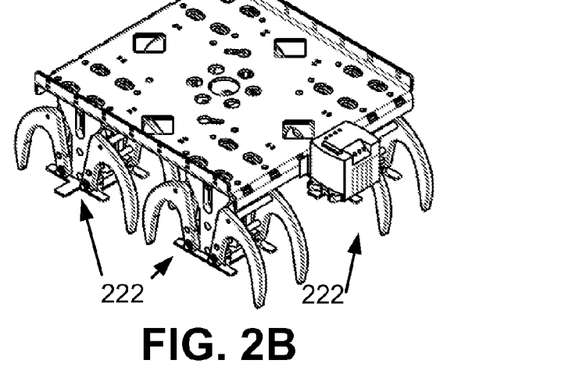
FIGS. 2B, 2C, and 2D show a top perspective, a front elevational and a side elevational views, respectively, of the alternative end of arm attachment shown in FIG. 2A.
Figure 2C:
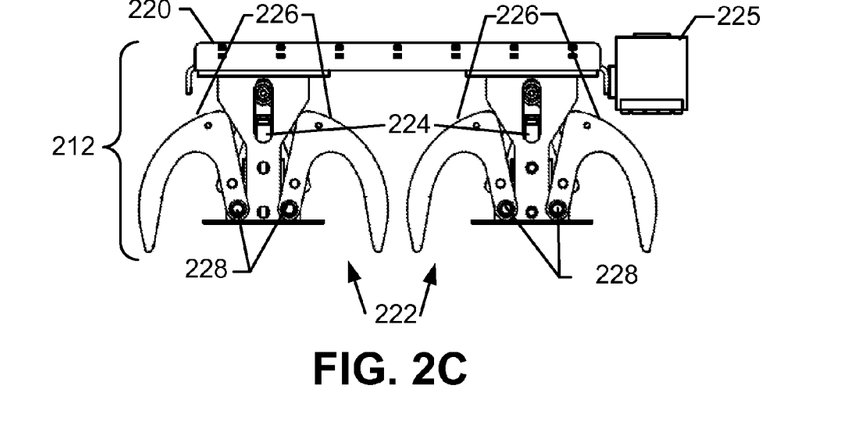
Figure 2D:
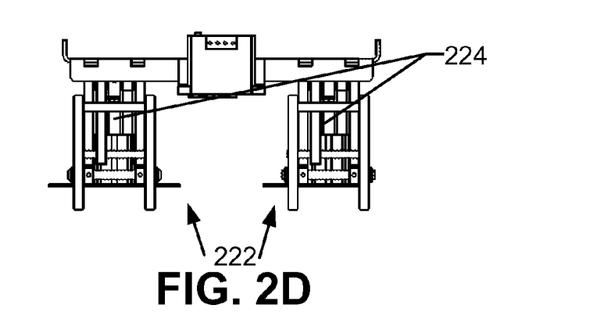
Figure 3A:
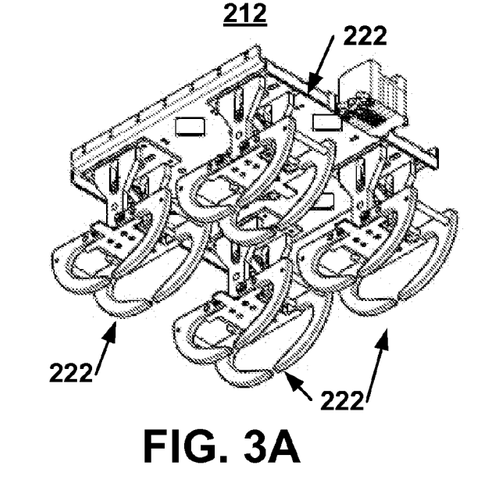
FIG. 3A shows a bottom perspective view of the alternative end of arm attachment shown.
Figure 3B:
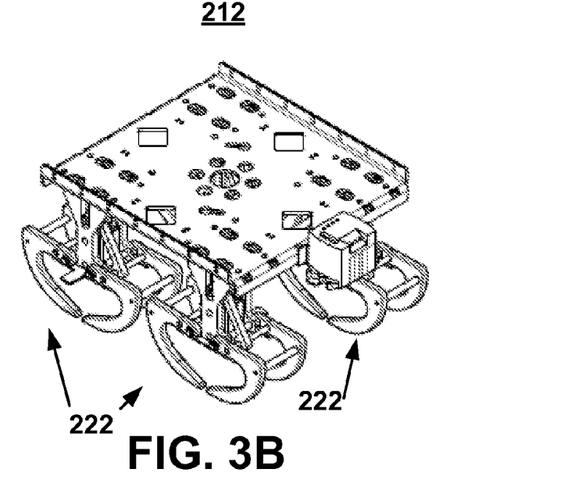
FIGS. 3B, 3C, and 3D show a top perspective, a front elevational and a side elevational views, respectively, of the alternative end of arm attachment shown in FIG. 3A.
Figure 3C:
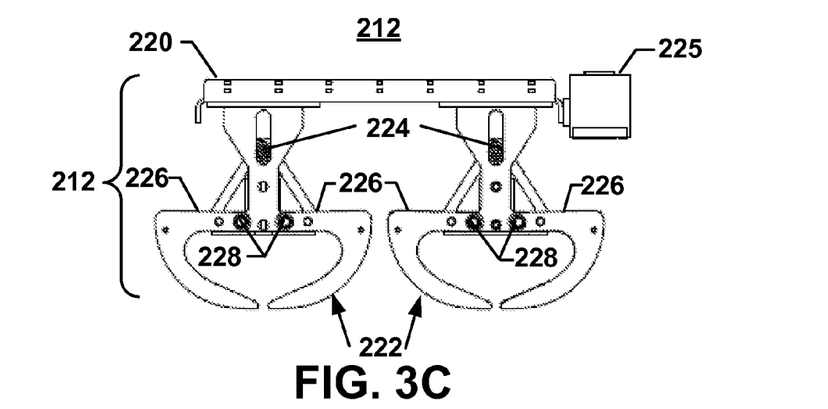
Figure 3D:
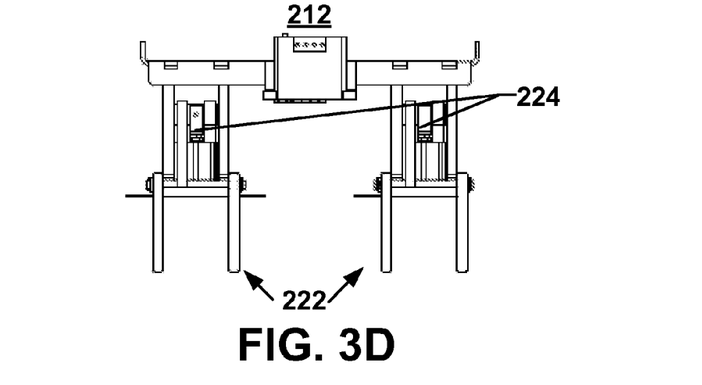

FIG. 1 shows a front elevational view of an apparatus 108 comprising a robotic arm 110, an end of arm tool 112 for engaging one or more articles 114, and a conveyor 116 for conveying the article 114 generally toward the end of arm tool 112. Note that FIG. 1 and the other figures herein are not to scale and are simplified for the purposes of illustration and explanation. For example, only a portion of the conveyor is shown for the sake of simplicity. Moreover, FIG. 1 includes a magnified representation of the end of arm tool 112 to more clearly highlight its features.

The robotic arm 110 may pivot, turn, rotate, or maneuver in any manner from its base 111 to articulate the end of arm tool 112 to any desired position and/or location, particularly relative to the conveyor 116 and to a delivery location.

The end of arm tool 112 may have a base 120, one or more engagement mechanisms 122, with one or more power mechanisms 124. Power mechanism 124 forms part of the power and control mechanism 125. The details of the control mechanism 125 are shown for the purposes of simplicity, although one skilled in the art would appreciate that the control mechanism may include or be connected to one or more mechanical and or electronic components to control the power mechanism 124. The base 120 supports the engagement mechanism 122 and attaches the tool 112 to the robotic arm 110.

The engagement mechanism 122 may include holding mechanisms, such as fingers 126 that pivot about pins 128 for engaging the articles 114. Various numbers of fingers may be employed. For example, FIG. 1 and the figures that follow show tools 112 and 212 having sixteen fingers, which are provided as four sets with each set having two pairs of opposable fingers 126 (or 226, in the case of tool 212) to form engagement mechanism 122 (or 222, in the case of tool 212). The fingers 126 may be curved, as shown, to assist in engaging the article. Each finger 126 may be constructed or composed of metal, polymer, wood, ceramic, composite, or other suitable material. Each finger 126 may be connected to the power and/or control mechanism 124, which may, in turn, be attached at one end to base 120. Additionally or alternatively, electric motors, such as servo motors, may be supplied to provide power and control to holding mechanisms. Of course, various sized, shaped, or configured engagement mechanisms 122 could be moved through pivoting, scissor, curling, or extension motions or through any other form of suitable movement to move the engagement mechanisms 122 through a range of motions.

FIGS. 2 and 3 show a second implementation of an end of arm tool 212 with engagement mechanisms 222 in an open and closed position, respectively. End of arm tool 212 has similar features to end of arm tool 112, however, fingers 226 in each engagement mechanism 222 are actuated in unison by a single power mechanism 224, which is controlled by control mechanism 225. As fingers 226 of each engagement mechanism 222 are operated in unison, the fingers 226 pivot about pins 228 to substantially simultaneously engage an article 114.

Figure 4A:
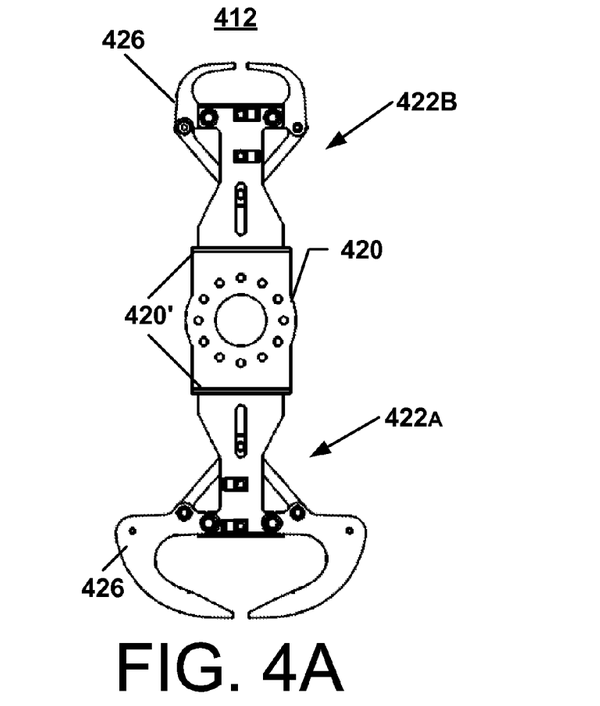
FIGS. 4A and 4B respectively show a front elevational view and a perspective view of an example of an end of arm attachment.
Figure 4B:
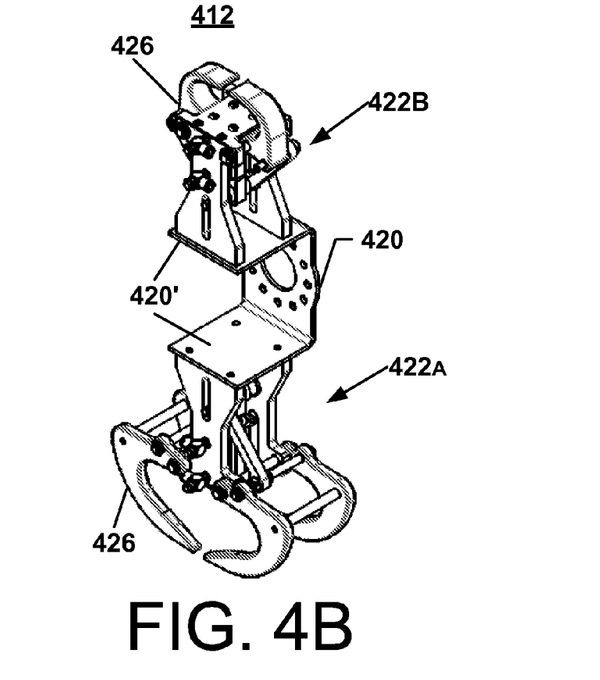

FIG. 4 shows an alternative implementation of an end of arm tool 412 that includes a base 420 configured to support two engagement mechanisms 422A and 422B in an opposed configuration. As shown, the first engagement mechanism 422A is similar to engagement mechanism 222. A relatively smaller engagement mechanism 422B is oriented to face 180° away from the first engagement mechanism 422A. Of course, this configuration is illustrative only and other engagement mechanisms and configurations may be implemented. For example, the base 420 may be configured to place three engagement mechanisms 422A in a 120° orientation or four engagement mechanisms 422B in a 90° orientation, and so forth. Also, multiple engagement mechanisms 422A (or 422B) may be located on each side of the base 420 in a parallel or serially extending configuration. In other words, each portion 420' of base 420 may accommodate the configuration of engagement mechanisms 222 shown in FIGS. 2 and 3.

FIGS. 5-8 illustrate an apparatus 508, which is similar to apparatus 108, but configured with four engagement mechanisms 222, progressing through four illustrative steps in an engagement process.

Figure 5A:
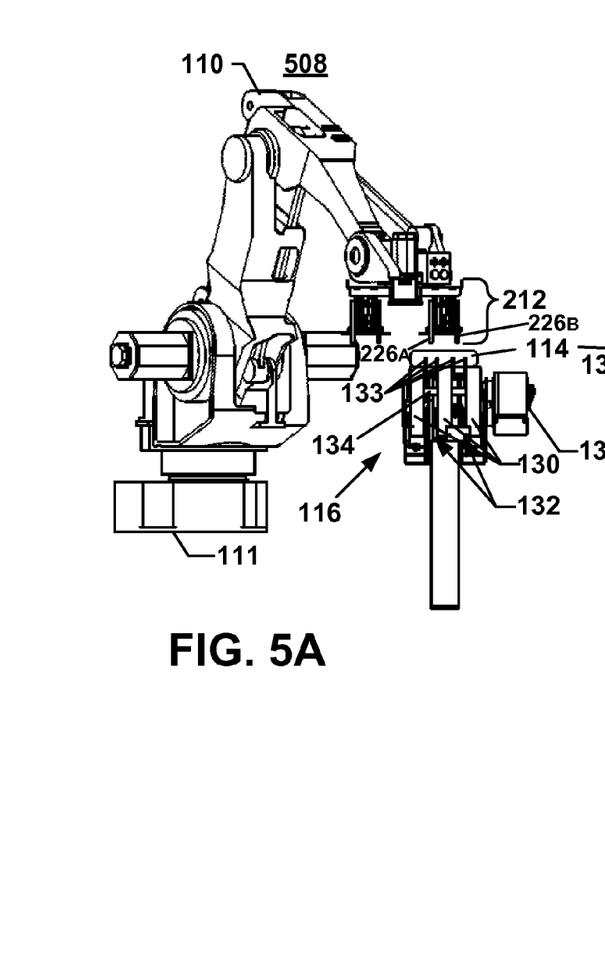
FIGS. 5A and 5B respectively show a side elevational view and a front elevational view of an apparatus according to one implementation at a first step in an illustrative process.
Figure 5B:
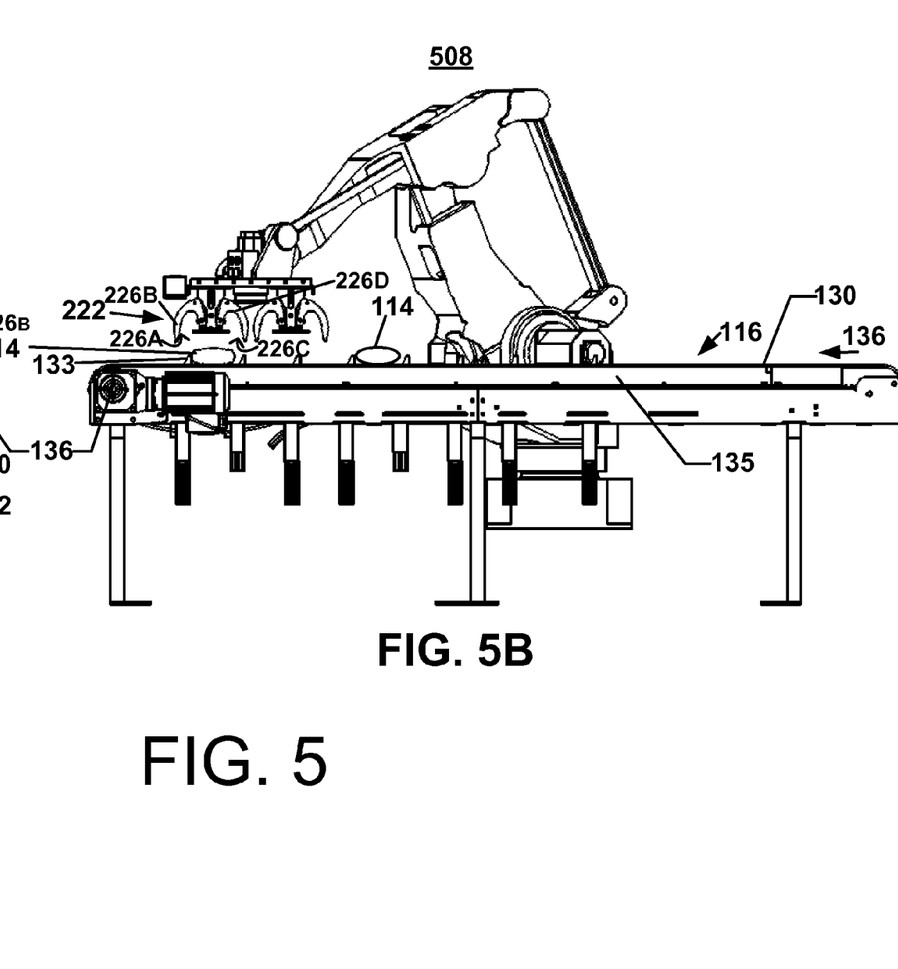

FIG. 5 shows an apparatus 508 having a robotic arm 110 for manipulating the end of arm tool 212. The end of arm tool 212 is generally located proximate to article 114, which is or has been conveyed on conveyor 116. The conveyor 116 may have one or more tracks 130 that form one or more grooves 132 for allowing fingers 126 on the end of arm tool 112 to pass between and below adjacent tracks 130 so that the fingers 126 can engage or grasp the bottom and sides of the article 114. Tracks 130 may be constructed of metal, polymer, composite, fabric, or other suitable material. Stops 133 may be placed proximate to tracks 130 in order to hold article 114 for engagement by engagement mechanisms 222. Moreover, multiple stops 133 may be employed to stop multiple articles 114 for engagement by the various engagement mechanisms 222 on the end of arm tool 212.

Tracks 130 may be rotated about an axle 134 by a motor 136. Additionally or alternatively, each track 130 may be moved independent of adjacent tracks in order to better control the conveying process, such as to rotate article 114 into a proper position for engagement by tool 212. Tracks 130 may be mounted on track substrates 135 to extend groove 132 to a desired depth.

As shown in FIG. 5, the conveyor 116 advances article 114 generally in the direction shown by arrow 136 which may be toward the end of arm tool 212. The article 114 may pass a photo sensor or other detection mechanism, which may detect the leading edge, the trailing edge or any other relevant point indicating the position of article 114. The position of the end of arm tool 212 may be adjusted to position at least one of the fingers 126 in close proximity to article 114 based on the position information. Additionally or alternatively, stops 133 may be controlled to prevent progress of article 114 along conveyor 116 at a certain point.

Two fingers 226A and 226B are positioned within two grooves 132 to engage the leading edge of article 114 as it travels along conveyor 116. Additionally or alternatively, fingers 226A and 226B may extend between stops 133, after, or as, stops 133 prevent further progress of article 114 along conveyor 116. Two more fingers 226C and 226D may engage the trailing edge of article 114 in order to completely grab article 114 between fingers 226A, 226B, 226C, and 226D. The grooves 132 may assist tool 212 in engaging bottom and side portions of article 114. Any number of tracks, grooves and/or fingers in various combinations may be used to engage the article 114 with tool 112.

Figures 6A, 6B:
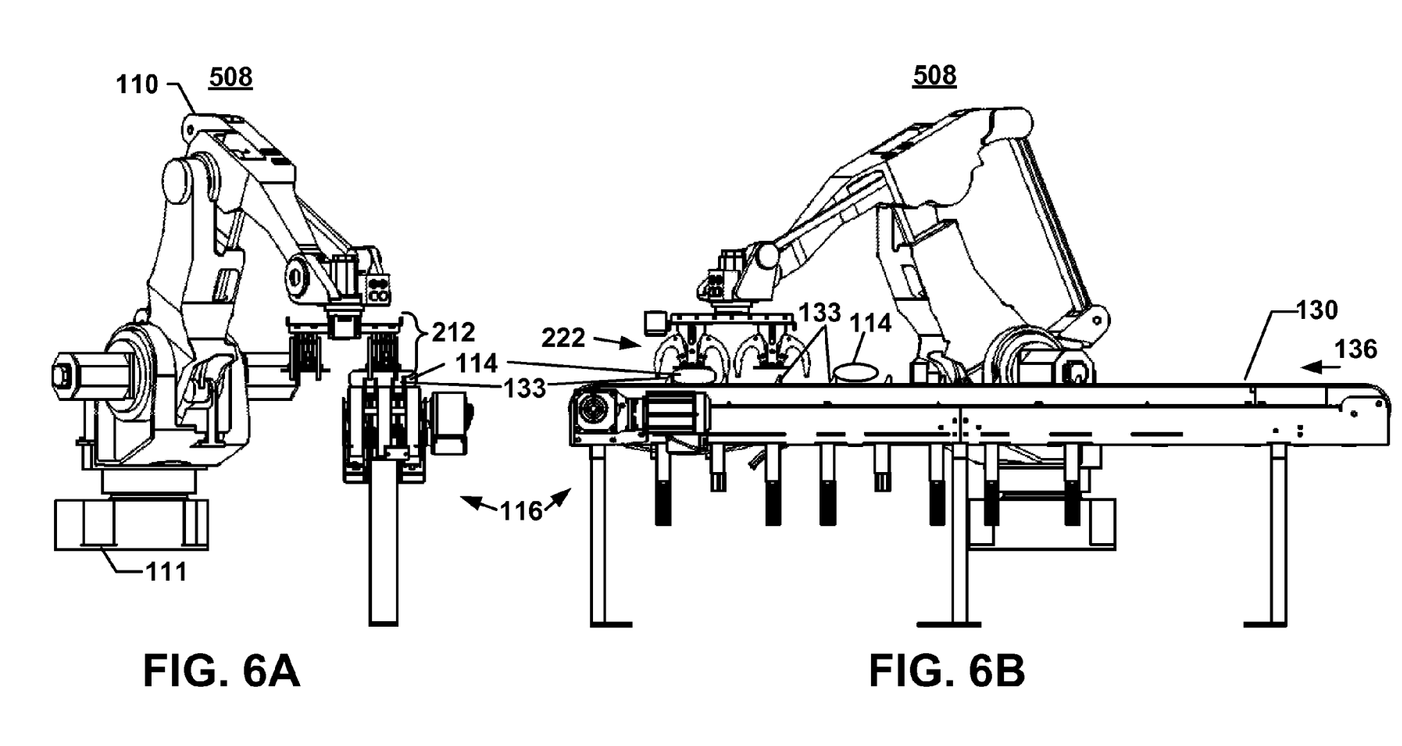
FIGS. 6A and 6B respectively show a side elevational view and a front elevational view of the apparatus of FIGS. 5A and 5B at a second step in the illustrative process.

FIG. 6 shows the end of arm tool 212 being positioned immediately prior to grasping article 114. According to this implementation, stops 133 have stopped article 114 from proceeding along direction 136 of the conveyor 116. A sensor indicator or other cue may be provided to indicate when engagement mechanism 222 is near, in contact with, and/or ready to grasp, article 114.

Figure 7A:
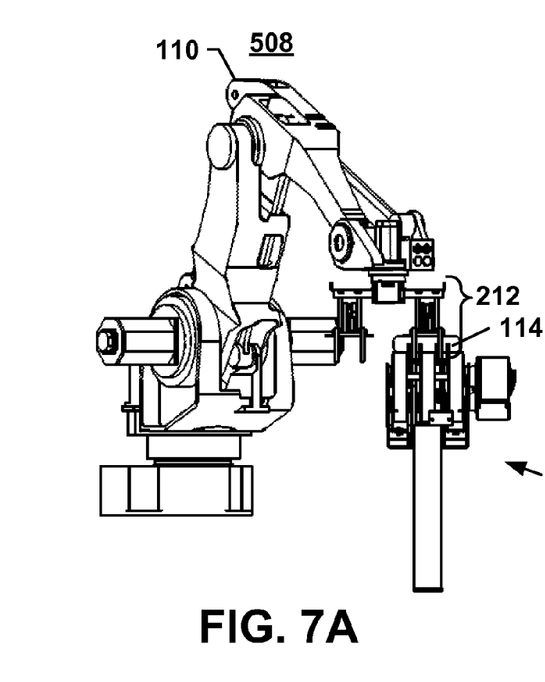
FIGS. 7A and 7B respectively show a side elevational view and a front elevational view of the apparatus of FIGS. 5A and 5B at a third illustrative step in the illustrative process.
Figure 7B:
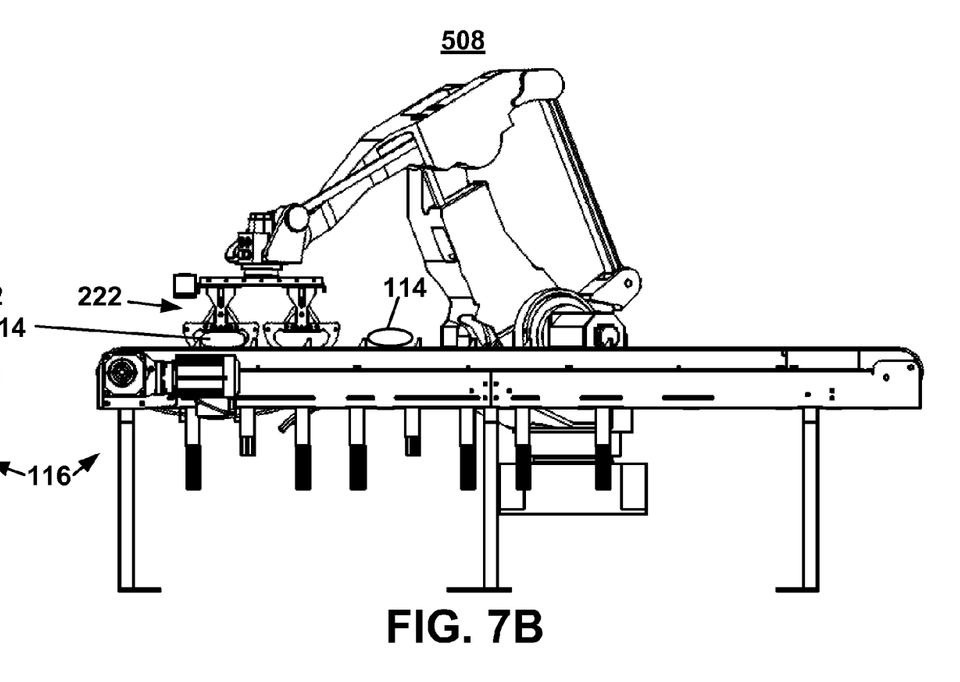

FIG. 7 shows the end of arm tool 212 grasping article 114. According to this implementation, only one article 114 is shown being grasped by one of the engagement mechanisms 222. However, it is readily apparent that multiple articles 114 may be fed serially, i.e. in a downstream manner, along the conveyor 116 and grasped by each of the engagement mechanisms 222 provided on end of arm tool 212.

Figure 8A:
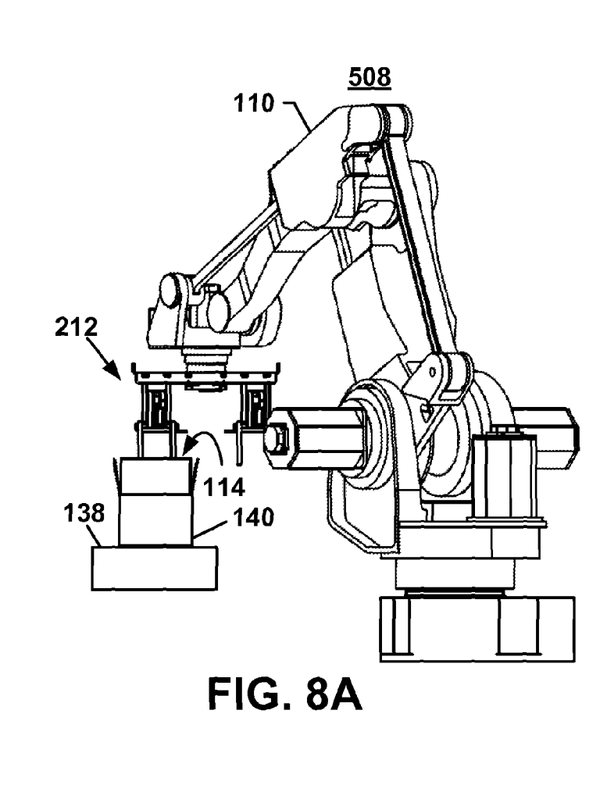
FIGS. 8A and 8B respectively show a side elevational view and a front elevational view of the apparatus of FIGS. 5A and 5B at a forth step the illustrative process.
Figure 8B:
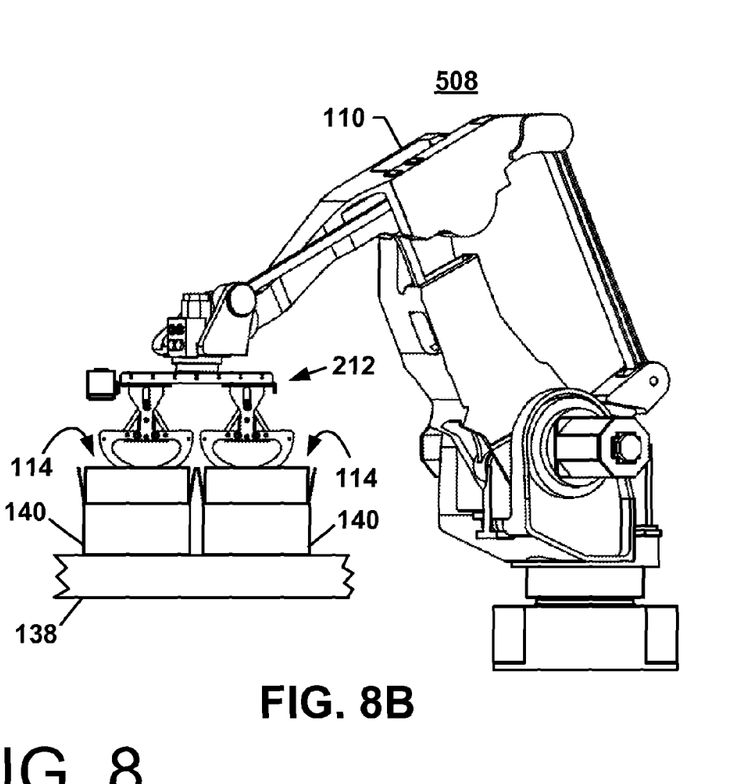

FIG. 8 shows a further step of transporting the article 114 from a conveyor 116 to a container 140 for storage, protection, shipping, of the like. Container 140 may be provided on a conveyor 138, which may be a conveyor belt wheel, or other suitable conveyor mechanism for conveying an article and/or a container 140. Articles 114 may be dropped, placed, or otherwise removed or disengaged from the engagement mechanisms 222 and the end of arm tool 412. For, example, as shown in FIG. 8, the article 114 may be placed into a packaging box 140 for storage and/or shipment.

Figures 9, 9B:
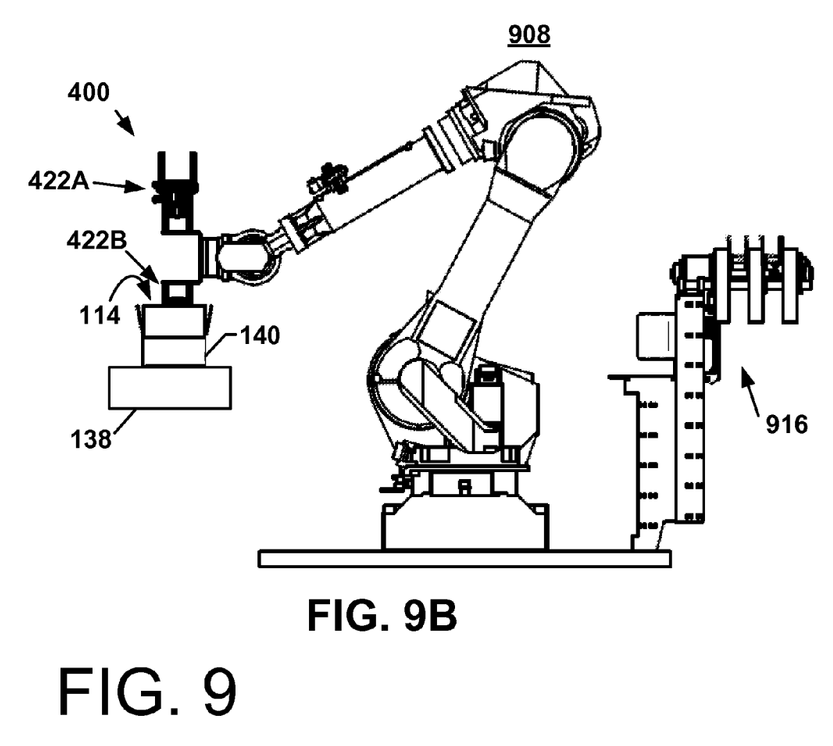
FIGS. 9A and 9B respectively show a perspective view and a side elevational view of an apparatus according to an alternative implementation, shown at one illustrative step in a process.
Figure 9A:
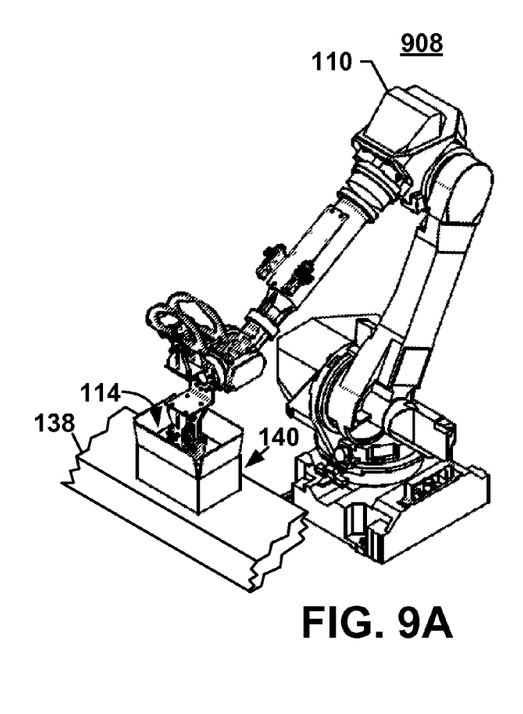

FIG. 9 shows an alternative apparatus 908 having an end of arm tool 400. The apparatus 908, like the apparatus 508 in FIG. 8, may transport an article 114 from a conveyor 916 to a container 140 for storage, protection, shipping, or the like. Although engagement mechanism 422A is not shown with an article, it is appreciated that each engagement mechanisms, 422A and 422B, may grasp an article 114 for transporting to a box or carton 140.

In the implementations shown in FIGS. 1-8, two articles 114 may be picked up either simultaneously or in relatively short succession. This is accomplished by serially aligning two adjacent sets of fingers configured as two engagement mechanisms 222, each engagement mechanism 222 for engaging at least one discrete article, such as article 114. As can be seen with reference to FIG. 5, each engagement mechanism 222 may include two pairs of fingers which are aligned in an opposable configuration. Thus, as described above, the pair of fingers 226A and 226B may be made to oppose the pair of fingers 226C and 226D. Utilizing such a finger configuration may provide a stable grasp to engage the article 114 for removal from conveyor 116. Of course, any number of fingers could be added to each side and different numbers of fingers could be added to each opposing side. As one example, one finger could be placed in an opposable configuration with three fingers. Additionally or alternatively, one or more fingers may be made to oppose a scoop, blade or other holding mechanism to engage the article 114. Still further, the opposably engaging fingers, scoops, blades or other holding mechanisms need not all actively move to engage the article 114. For example, the leading edge of the article may be engaged by one or more holding mechanisms that are relatively fixed with respect to the end of arm tool, while one or more other holding mechanisms advances, slides, or "scoops" the article toward the holding mechanism positioned at the leading edge of the article to engage the article.

The implementation shown in FIGS. 5 through 8 demonstrates an implementation where two bags, fed serially on conveyor 116, are picked up simultaneously or in serial succession, which may depend on the separation distance between the bags. If the separation between the bags or the alignment of one or more bags is unacceptable, programming within the apparatus may dictate that the bag be rejected and not engaged. In such a case, the bag could be engaged by a different engagement mechanism 222 or removed by an operator or another piece of machinery or automated process to receive and further process or package that article 114.

The end of arm tool, e.g. end of arm tools 112, 212, 412, may include multiple engagement mechanisms 222 that form an array of serially aligned and parallel aligned engagement mechanisms 222. For example, the end of arm tool 212 has four engagement mechanisms 222, which are aligned in serial (i.e. end-to-end) and parallel (i.e. side-by-side) directions. Of course, the end of arm tool 212, may be provided with three, four, or "n" number of engagement mechanisms 222 to engage and/or pick up three, four, or "n" number of articles 114, respectively. Furthermore, each set of fingers (e.g. 126, 226, and so forth) may be configured to grab more than one article. In such an instance, the fingers may engage the leading edge of a first article and the trailing edge of a last article.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A conveying system, comprising:
    a robotic arm;
    an end of arm tool, connected to an end of the robotic arm, the end of arm tool comprising:
        a plurality of engagement mechanisms, wherein the plurality of engagement mechanisms are arranged in an array with each engagement mechanism having at least one engagement mechanism parallel to it and at least one engagement mechanism in serial with it, and wherein each engagement mechanism comprises:
            opposed first and second fingers, movable between an engaged position wherein the fingers close together grasp a bottom and sides of an article, and a released position wherein the fingers separate to release the article or prepare to grasp a second article;
        a conveyor system, comprising:
            a conveyor belt having a plurality of substantially parallel conveyor tracks, wherein adjacent tracks are separated by a groove; and
            multiple stops, wherein the multiple stops are arranged in an array with each stop having at least one stop parallel to it and at least one stop in serial with it, and wherein the array of stops corresponds to the array of the plurality of engagement mechanisms such that articles stopped by the array of stops are positioned for engagement by the array of engagement mechanisms; and
        at least one power mechanism to move the opposed fingers between the engaged position and the released position, wherein movement of the opposed fingers from the released position to the engaged position moves the opposed fingers into the groove between adjacent tracks of the conveyor belt, and then through portions of that groove, and wherein the opposed fingers, moving through the groove between tracks of the conveyor, approach an article to be picked up such that the opposed fingers, both moving through the groove between adjacent tracks, engage upstream and downstream sides of the article, respectively, and both opposed fingers move underneath the article to thereby grasp the article, and to then lift the article by operation of the robotic arm.

2. The end of arm tool of claim 1, wherein if an alignment of one of the articles stopped by the multiple stops is unacceptable, programming prevents operation of an associated engagement mechanism.

3. The end of arm tool of claim 1, wherein if a separation between the articles stopped by the multiple stops is unacceptable, programming prevents operation of an associated engagement mechanism.

4. A method of handling an article, the method comprising:
   locating an article moving on a conveyor, wherein the conveyor is a conveyor belt, the method further comprising:
      providing the article on the conveyor belt to convey the article toward a robotic arm with an end of arm tool, the conveyor belt having two substantially parallel conveyor tracks with a groove provided between the two adjacent conveyor tracks; and
   grasping the located article with the end of arm tool, the end of arm tool having a first and second finger for engaging the article provided and conveyed on the conveyor belt, wherein the fingers travel through grooves defined between tracks of the conveyor during the grasping, wherein grasping the located article comprises:
      engaging a portion of the article with the end of arm tool, the first finger to extend into the groove to engage a leading edge portion of the article being conveyed on the conveyor belt and the second finger to extend into the groove between the tracks to engage a trailing edge portion of the article being conveyed on the conveyor belt.

5. The method of handling an article of claim 4, wherein the locating comprises stopping the article with a stopping mechanism prior to grasping the located article with fingers of the end of arm tool.

6. The method of handling an article of claim 4, wherein locating comprises sensing the article with a sensing mechanism.

7. The method of handling an article of claim 4, wherein the first and second fingers engage the article substantially simultaneously.

8. The method of handling an article of claim 4, wherein the article is a first article and wherein the fingers are associated with a first engagement mechanism of the end of arm tool, and further comprising:
   locating a second article and grasping the second article with fingers associated with a second engagement mechanism of the end of arm tool; and
   transporting the first and second articles away from the conveyor.

9. An article transportation system, comprising:
   a conveyor to convey an article, wherein the conveyor comprises:
   at least two tracks defining at least one groove between the at least two tracks;
   multiple stops, wherein the multiple stops are arranged in an array with each stop having at least one stop parallel to it and at least one stop in serial with it; and
   an end of arm tool, comprising opposed first and second fingers, movable between an engaged position wherein the fingers close together grasp a bottom and sides of an article, and a released position wherein the fingers separate to release the article or prepare to grasp a second article;
   at least one power mechanism to move the opposed fingers between the engaged position and the released position, wherein movement of the opposed fingers from the released position to the engaged position moves the opposed fingers into the groove between adjacent tracks of the conveyor belt, and then through portions of that groove, and wherein the opposed fingers, moving through the groove between tracks of the conveyor, approach an article to be picked up such that the opposed fingers, both moving through the groove between adjacent tracks, engage upstream and downstream sides of the article, respectively, and both opposed fingers move underneath the article to thereby grasp the article, and to then lift the article by operation of the end of arm tool.

* * * * *